(12) United States Patent
Ohnishi (10) Patent No.: US 7,539,392 B2
(45) Date of Patent: May 26, 2009

(54) REPRODUCTION APPARATUS AND RECORDING APPARATUS, AND CONTROLLING METHOD THEREOF

(75) Inventor: Shinji Ohnishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 821 days.

(21) Appl. No.: 10/716,663

(22) Filed: Nov. 20, 2003

(65) Prior Publication Data

US 2004/0101288 A1  May 27, 2004

(30) Foreign Application Priority Data

Nov. 22, 2002  (JP) .............................. 2002-339949

(51) Int. Cl.
*H04N 5/91* (2006.01)
(52) U.S. Cl. .............................. 386/68; 386/83; 386/95; 386/124; 386/109; 386/71; 386/111; 386/96
(58) Field of Classification Search .................. 386/68, 386/109, 71, 111, 95–96, 83, 124
See application file for complete search history.

(56) References Cited

U.S. PATENT DOCUMENTS

| 6,052,507 | A  | * | 4/2000 | Niida et al. ..................... 386/68 |
| 6,363,207 | B1 | * | 3/2002 | Duruoz et al. ................. 386/68 |
| 6,856,756 | B1 |   | 2/2005 | Mochizuki et al. ............ 386/68 |
| 7,305,496 | B2 | * | 12/2007 | Ohnishi ........................ 710/15 |
| 2003/0118158 | A1 | * | 6/2003 | Hattori ......................... 379/68 |
| 2003/0133024 | A1 |   | 7/2003 | Ohnishi ................. 348/231.99 |
| 2004/0114911 | A1 | * | 6/2004 | Ito .............................. 386/111 |
| 2006/0078296 | A1 | * | 4/2006 | Takao .......................... 386/68 |

FOREIGN PATENT DOCUMENTS

| JP | 11-353790 | 12/1999 |
| JP | 2000-41218 | 2/2000 |
| JP | 2002-175087 | 6/2002 |
| JP | 2002-215483 | 8/2002 |
| WO | WO 02/47087 | 6/2002 |
| WO | WO 02/047087 | 6/2002 |
| WO | WO 02/080542 A1 | 10/2002 |

OTHER PUBLICATIONS

IEC 61883-1, Consumer audio/video equipment—Digital interface—Part 1: General, 1st Edition 1998-02, pp. 1-83.
IEC 61883-4, Consumer audio/video equipment—Digital interface—Part 4: MPEG2-TS data transmission, 1st Edition 1998-02, pp. 1-23.
Jun. 20, 2007 Chinese Official Action (with English language partial translation).

* cited by examiner

*Primary Examiner*—Thai Tran
*Assistant Examiner*—Helen Shibru
(74) *Attorney, Agent, or Firm*—Fitzpatrick, Cella, Harper & Scinto (57) ABSTRACT

A reproduction apparatus includes a reproduction unit and a communication unit. The reproduction unit reproduces digital video data from a storage medium. The communication unit generates a packet including additional data and the digital video data reproduced from the storage medium, and transfers the generated packet. The additional data includes both first data indicating a playing direction and second data indicating a playing speed.

8 Claims, 5 Drawing Sheets

FIG. 1

| 0 | 0 | SID | DBS | FN | QPC | SPH | Rsv | DBC |
| 0 | 0 | FMT | FDF | | | | | |
| 1 | 0 | RESERVED | | MODE | | STATE | | |

FIG. 2

| VALUE | MEANING |
|---|---|
| $C2_{16}$ | RECORD MODE |
| $C3_{16}$ | PLAY MODE |

FIG. 3

| VALUE | STATE | MEANING |
|---|---|---|
| $75_{16}$ | RECORD | RECORD AT NORMAL SPEED |
| $7D_{16}$ | RECORD PAUSE | PAUSE IN RECORDING |

FIG. 4

| VALUE | STATE | MEANING |
|---|---|---|
| $31_{16}$ | SLOWEST FORWARD | PLAY AT A SPECIAL EFFECT SPEED DESCRIBED IN DETAIL BELOW |
| $32_{16}$ | SLOW FORWARD 6 | |
| $33_{16}$ | SLOW FORWARD 5 | |
| $34_{16}$ | SLOW FORWARD 4 | |
| $35_{16}$ | SLOW FORWARD 3 | |
| $36_{16}$ | SLOW FORWARD 2 | |
| $37_{16}$ | SLOW FORWARD 1 | |
| $38_{16}$ | X1 | PLAY AT NORMAL SPEED |
| $39_{16}$ | FAST FORWARD 1 | PLAY AT A SPECIAL EFFECT SPEED DESCRIBED IN DETAIL BELOW |
| $3A_{16}$ | FAST FORWARD 2 | |
| $3B_{16}$ | FAST FORWARD 3 | |
| $3C_{16}$ | FAST FORWARD 4 | |
| $3D_{16}$ | FAST FORWARD 5 | |
| $3E_{16}$ | FAST FORWARD 6 | |
| $3F_{16}$ | FASTEST FORWARD | |
| $41_{16}$ | SLOWEST REVERSE | PLAY IN REVERSE AT A SPECIAL EFFECT SPEED DESCRIBED IN DETAIL BELOW |
| $42_{16}$ | SLOW REVERSE 6 | |
| $43_{16}$ | SLOW REVERSE 5 | |
| $44_{16}$ | SLOW REVERSE 4 | |
| $45_{16}$ | SLOW REVERSE 3 | |
| $46_{16}$ | SLOW REVERSE 2 | |
| $47_{16}$ | SLOW REVERSE 1 | |
| $48_{16}$ | X1 REVERSE | PLAY AT NORMAL SPEED IN REVERSE |
| $49_{16}$ | FAST REVERSE 1 | PLAY IN REVERSE AT A SPECIAL EFFECT SPEED DESCRIBED IN DETAIL BELOW |
| $4A_{16}$ | FAST REVERSE 2 | |
| $4B_{16}$ | FAST REVERSE 3 | |
| $4C_{16}$ | FAST REVERSE 4 | |
| $4D_{16}$ | FAST REVERSE 5 | |
| $4E_{16}$ | FAST REVERSE 6 | |
| $4F_{16}$ | FASTEST REVERSE | |
| $65_{16}$ | REVERSE | PLAY AT NORMAL SPEED IN REVERSE |
| $6D_{16}$ | REVERSE PAUSE | PAUSE IN REVERSE PLAY |
| $75_{16}$ | FORWARD | PLAY AT NORMAL SPEED |
| $7D_{16}$ | FORWARD PAUSE | PAUSE IN PLAY |

| 0 | 0 | SID | DBS | FN | QPC | SPH | Rsv | DBC |
|---|---|-----|-----|----|----|-----|-----|-----|
| 0 | 0 | FMT | FDF | | | | | |
| 1 | 0 | PB DIR | SPEED_I | | | SPEED_D | | |

FIG. 7

| VALUE | MEANING |
|-------|---------|
| 0 | PLAY |
| 1 | RECORD |

FIG. 8

| VALUE | MEANING |
|-------|---------|
| 0 | FORWARD |
| 1 | REVERSE |

FIG. 9

REPRODUCTION APPARATUS AND RECORDING APPARATUS, AND CONTROLLING METHOD THEREOF

BACKGROUND OF THE INVENTION

1. Field of the Invention

The present invention relates to a digital video apparatus which is capable of transferring and receiving digital video data.

2. Related Background Art

The IEC 61883-4 is a standard that defines a protocol for transferring a transport stream (TS) packet of MPEG-2 using isochronous transfer prescribed by the IEEE Std 1394-1995. According to the IEC 61883-4, a TS packet should be transferred using a common isochronous packet (CIP) header prescribed by the IEC 61883-1.

Note that the IEEE Std 1394-1995 is described in detail in "IEEE Std 1934-1995, IEEE Standard for a High Performance Serial Bus", Institute of Electrical and Electronics Engineers, Inc. The IEC 61883-1 is described in detail in "IEC 61883-1, Consumer audio/video equipment—Digital interface—Part 1: General". In addition, the IEC 61883-4 is described in detail in "IEC 61883-4, Consumer audio/video equipment—Digital Interface—Part 4: MPEGS2-TS data transmission".

However, the IEC 61883-1 and the IEC 61883-4 do not prescribe in their specifications that a transmission source apparatus (an apparatus that reproduces digital video data from a storage medium and transfers the digital video data being reproduced, an apparatus that records digital video data in a storage medium and transfers the digital video data being recorded, or the like) should notify a transmission destination apparatus of an operation state (whether or not the apparatus is reproducing data, whether or not the apparatus is recording data, whether or not the apparatus is suspending recording or reproduction of data, a playing direction, a playing speed, and the like) of the transmission source apparatus by using a CIP header.

Therefore, the conventional transmission source apparatus has a problem that it cannot notify the transmission destination apparatus of an operation state of the transmission source apparatus unless a special command is used. In addition, the conventional transmission destination apparatus has a problem that it cannot learn of an operation state of the transmission source apparatus unless a special command is used. It should be -noted here that such a problem exists not only in the case in which digital video data encoded into a TS packet of MPEG-2 is transferred but also in the case in which digital video data is transferred using a data header such as a CIP header.

SUMMARY OF THE INVENTION

An object of the present invention is to overcome the above-described drawbacks.

Another object of the present invention is to make it possible for a transmission source apparatus to notify a transmission destination apparatus of an operation state of the transmission source apparatus without using a special command. Moreover, still another object of the present invention is to make it possible for the transmission source apparatus to notify a user of an operation state of the transmission source apparatus without using a special command.

A reproduction apparatus according to a preferred embodiment of the present invention, for example, includes: reproduction unit that reproduces digital video data from a storage medium; and communication unit that generates a packet including information on an operation state of the reproduction apparatus and the digital video data and transfers the generated packet isochronously.

A recording apparatus according to an another preferred embodiment of the present invention, for example, includes: recording unit that records digital video data on a storage medium; and communication unit that generates a packet including information on an operation state of the recording apparatus and the digital video data and transfers the generated packet isochronously.

A method of controlling a reproduction apparatus according to an another preferred embodiment of the present invention, for example, includes the steps of: reproducing digital video data from a storage medium; generating a packet including information on an operation state of the reproduction apparatus and the digital video data; and transferring the generated packet isochronously.

A method of controlling a recording apparatus according to a still another preferred embodiment of the present invention, for example, includes the steps of: recording digital video data on a storage medium; generating a packet including information on an operation state of the recording apparatus and the digital video data; and transferring the generated packet isochronously.

Still other objects, features and advantages of the present invention will become fully apparent from the following detailed description of the preferred embodiments.

DETAILED DESCRIPTION OF THE PREFERRED EMBODIMENTS

First Embodiment

Figure 1:
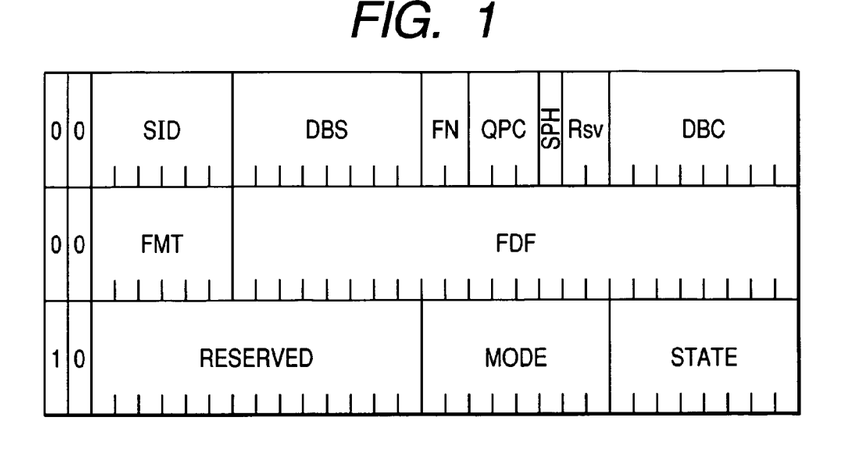
FIG. 1 is a diagram showing a constitution of a CIP header in a first embodiment.

A first embodiment of the present invention will be hereinafter described with reference to FIGS. 1 to 5. FIG. 1 is a diagram showing a constitution of a common isochronous packet (CIP) header in the first embodiment. The CIP header in the first embodiment is constituted of three quadlets (one quadlet consists of four bytes) as shown in FIG. 1.

A first quadlet has an SID field, a DBS field, an FN field, a QPC field, an SPH field, an Rsv field, and a DBC field, which are prescribed in the IEC 61883-1.

A second quadlet has an FMT field and an FDF field, which are prescribed in the IEC 61883-1.

A third quadlet has an Rsv field, a MODE field, and a STATE field, which are defined originally in the first embodiment. The Rsv field is a field for extension in the future, the MODE field is a field storing values representing operation modes of a transmission source apparatus, and the STATE field is a field storing values indicating whether or not the apparatus is playing data, whether or not the apparatus is recording data, whether or not the apparatus is suspending recording or playing of data, a playing direction, a playing speed, and the like.

Figure 2:
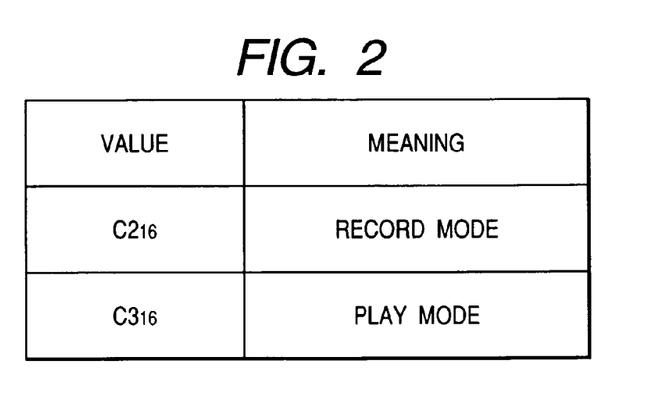
FIG. 2 is a diagram showing an example of values to be stored in a MODE field.

FIG. 2 is a diagram showing an example of values to be stored in the MODE field. In FIG. 2, $C2_{16}$ is a value indicating that an operation mode of the transmission source apparatus is a RECORD mode, and $C3_{16}$ is a value indicating that the operation mode of the transmission source apparatus is a PLAY mode.

Figure 3:
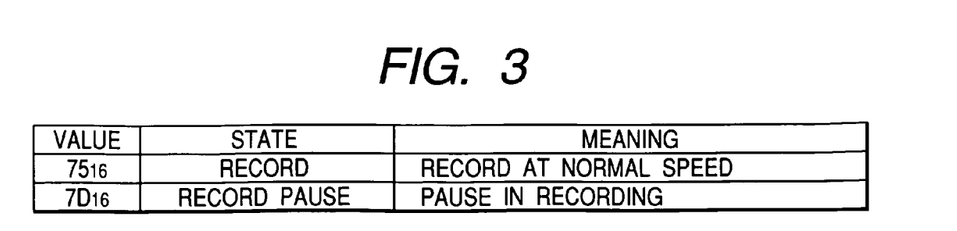
FIG. 3 is a diagram showing an example of values to be stored in a STATE field when an operation mode of a DV apparatus 10 is a RECORD MODE.

FIG. 3 is a diagram showing an example of values to be stored in the STATE field when the operation mode of the transmission source apparatus is the RECORD mode. In FIG. 3, $75_{16}$ (RECORD) is a value indicating a state in which the transmission source apparatus is recording data, and $7D_{16}$ (RECORD PAUSE) is a value indicating a state in which the transmission source apparatus is suspending recording.

Figure 4:
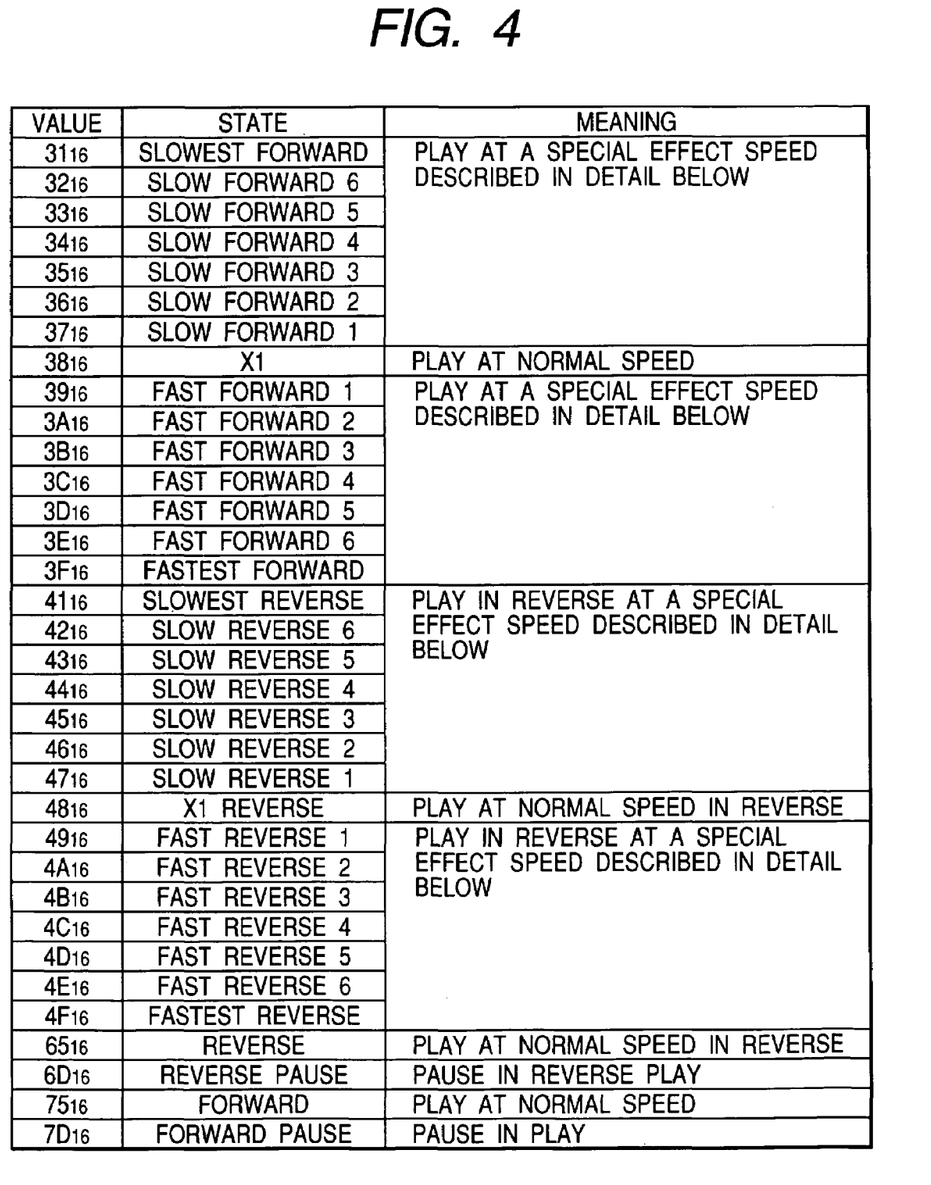
FIG. 4 is a diagram showing an example of values to be stored in the STATE field when the operation mode of the DV apparatus 10 is a PLAY MODE.

FIG. 4 is a diagram showing an example of values to be stored in the STATE field when the operation mode of the transmission source apparatus is the PLAY mode. In FIG. 4, $31_{16}$ (SLOWEST FORWARD) is a value indicating that the playing direction is a forward direction and the playing speed is a lowest speed, $3F_{16}$ (FASTEST FORWARD) is a value indicating that the playing direction is the forward direction and the playing speed is a highest speed, $41_{16}$ (SLOWEST REVERSE) is a value indicating that the playing direction is a reverse direction and the playing speed is the lowest speed, and $4F_{16}$ (FASTEST REVERSE) is a value indicating that the playing direction is the reverse direction and the playing speed is the highest speed.

In addition, $38_{16}$ (X1) and $75_{16}$ (FORWARD) are values indicating that the playing direction is the forward direction and the playing speed is a normal speed, and $48_{16}$ (X1 REVERSE) and $65_{16}$ (REVERSE) are values indicating that the playing direction is the reverse direction and the playing speed is the normal speed. $6D_{16}$ (REVERSE PAUSE) is a value indicating that the playing direction is the reverse direction and the playing speed is zero (pause), and $7D_{16}$ (FORWARD PAUSE) is a value indicting that the playing direction is the forward direction and the playing speed is zero (pause).

Figure 5:
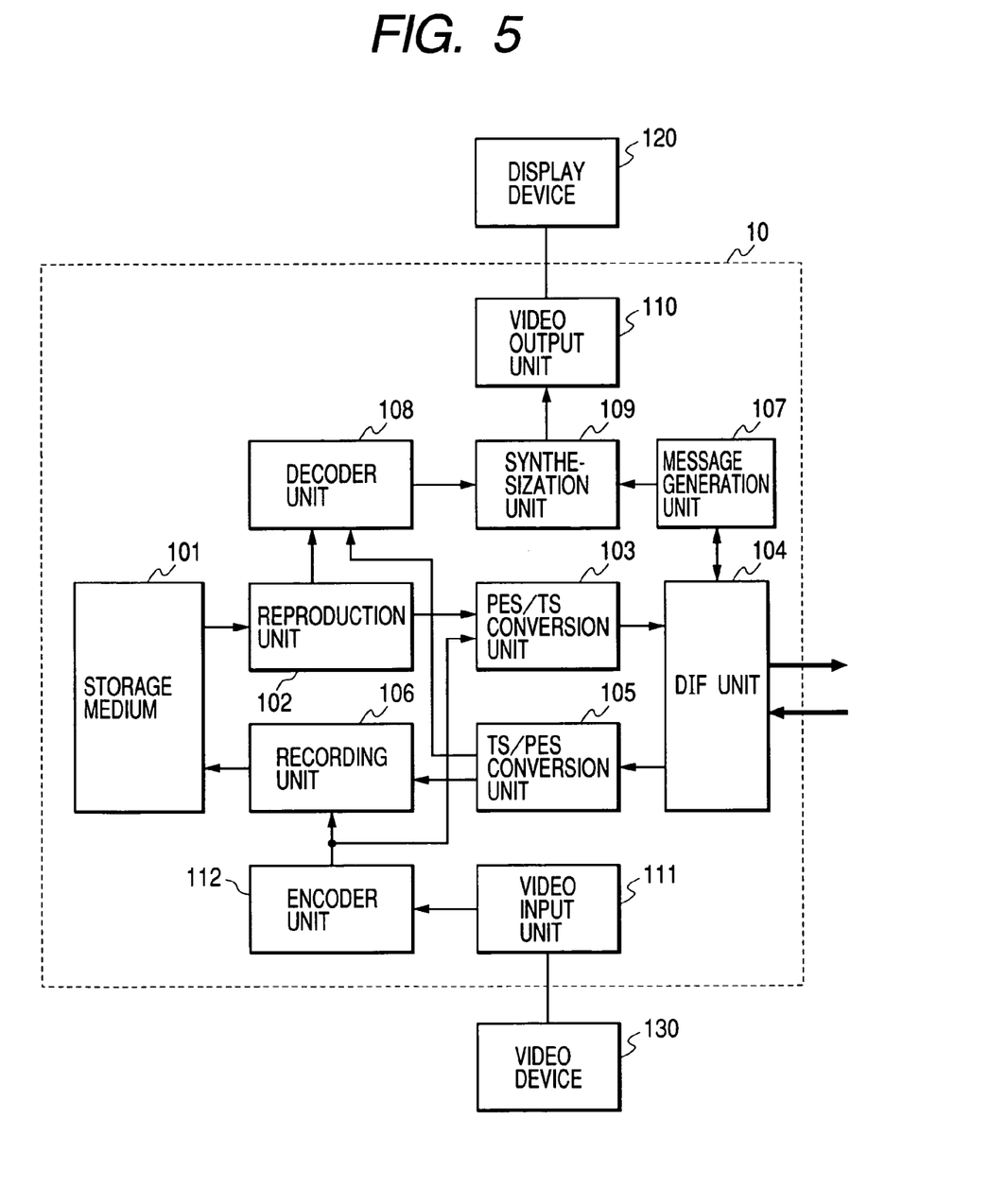
FIG. 5 is a diagram showing components of a digital video apparatus in the first embodiment.

FIG. 5 is a diagram showing components of a digital video (DV) apparatus 10 of the first embodiment. The DV apparatus 10 of the first embodiment is an apparatus that reproduces digital video data from a storage medium 101 and transfers the digital video data being played. The DV apparatus 10 is also an apparatus that records digital video data on the storage medium 101 and transfers the digital video data being recorded.

The storage medium 101 is a detachable storage medium such as a magnetic tape or a magneto-optical disk. Digital video data encoded into a packetized elementary stream (PES) packet defined by MPEG-2 is recorded on the storage medium 101.

A reproduction unit 102 reproduces the PES packet from the storage medium 101. If data is played at a special speed, the PES packet may not be reproduced normally (e.g., in the case in which the storage medium 101 is a magnetic tape). Thus, in the first embodiment, in the case in which data is played at the special speed, the reproduction unit 102 does not supply the PES packet to a PES/TS conversion unit 103, and the PES/TS conversion unit 103 does not supply a TS packet to a DIF unit 104 either.

The PES/TS conversion unit 103 converts a PES packet obtained from the reproduction unit 102 or an encoder unit 112 into a transport stream (TS) packet defined by MPEG-2.

A digital interface (DIF) unit 104 complies with the IEEE Std 1394-1995 and related standards thereof, and is capable of generating and extracting the CIP header shown in FIG. 1.

The DIF unit 104 performs processing for generating one source packet from one TS packet obtained from the PES/TS conversion unit 103, processing for generating one CIP header for every N (N is ⅛, ¼, ½, or an integer equal to or larger than 1) source packets, processing for generating one isochronous packet from the N source packets and the one CIP header, and processing for transferring one isochronous packet for each isochronous cycle (125 μsec).

In the case in which data is played at the special speed, the reproduction unit 102 does not supply a PES packet to the PES/TS conversion unit 103, and the PES/TS conversion unit 103 does not supply a TS packet to the DIF unit 104 either. Thus, the DIF unit 104 performs processing for generating an isochronous packet that includes one CIP header but does not include N source packets. In the first embodiment, the isochronous packet that includes one CIP header but does not include N source packets is called a "null packet".

For example, in the case in which data is played in the forward direction at a speed 1.0 times the normal speed (i.e., the normal speed) (in the case of FORWARD), the DIF unit 104 generates a CIP header in which $C3_{16}$ (a value indicating that the operation mode is the PLAY mode) is stored in the MODE field and $75_{16}$ (a value indicating that the playing direction is the forward direction and the playing speed is the normal speed) is stored in the STATE field. Then, the DIF unit 104 generates an isochronous packet including one CIP header and N source packets and transfers the generated isochronous packet.

Further, for example, in the case in which data is played in the reverse direction at a fastest speed (i.e., the special speed) (in the case of FASTEST REVERSE), the DIF unit 104 generates a CIP header A in which $C3_{16}$ (a value indicating that the operation mode is the PLAY mode) is stored in the MODE field and $4F_{16}$ (a value indicating that the playing direction is the reverse direction and the playing speed is the fastest speed) is stored in the STATE field. Then, the DIF unit 104 generates an null packet including the CIP header and transfers the generated null packet.

In addition, the DIF unit 104 performs processing for extracting N (N is ⅛, ¼, ½, or an integer equal to or larger than 1) source packets and one CIP header from one isochronous packet transferred from the transmission source apparatus, processing for supplying a third quadlet of the extracted CIP header to a message generation unit 107, and processing for extracting a TS packet from the extracted source packets.

In the case in which the transmission source apparatus is playing data at the special speed, a null packet is transferred from the transmission source apparatus. In this case, the DIF unit 104 performs processing for extracting one CIP header from the received null packet and processing for supplying a third quadlet of the extracted CIP header to the message generation unit 107.

A TS/PES conversion unit 105 converts the TS packet obtained from the DIF unit 104 into a PES packet.

A recording unit 106 records the PES packet obtained from the TS/PES conversion unit 105 onto the storage medium 101.

The message generation unit 107 analyzes the third quadlet obtained from the DIF unit 104 to detect an operation state (whether or not the apparatus is playing data, whether or not the apparatus is recording data, whether or not the apparatus is suspending recording or playing of data, a playing direction, a playing speed, and the like) of the transmission source apparatus, generating a message representing an operation state of the transmission source apparatus (hereinafter referred to as status message).

A decoder unit 108 decodes the PES packet obtained form the reproduction unit 102 or the TS/PES conversion unit 105 and generates digital video data from the decoded PES packet.

A synthesization unit 109 synthesizes the status message obtained from the message generation unit 107 with the digital video data obtained from the decoder unit 108 such that the status message is displayed in a predetermined position. In the case in which the DIF unit 104 receives a null packet, the synthesization unit 109 synthesizes the status message obtained from the message generation unit 107 with a blue background image (or an image which is decoded before the null packet is received) so that the status message is displayed in a predetermined position. Consequently, a user can learn of an operation state of the transmission source apparatus.

A video output unit 110 converts digital video data obtained from the synthesization unit 109 into a video signal and outputs the video signal. As a result, a video signal outputted from the video output unit 110 is displayed on a display device 120.

A video input unit 111 converts a video signal outputted from a video device 130 into digital video data.

The encoder unit 112 encodes the digital video data obtained from the video input unit 111 and generates a PES packet from the encoded digital video data.

In this way, according to the DV apparatus 10 of the first embodiment, the CIP header shown in FIG. 1 can be transferred to the transmission destination apparatus. Thus, the DV apparatus 10 can notify the transmission destination apparatus of an operation state (whether or not the apparatus is playing data, whether or not the apparatus is recording data, whether or not the apparatus is suspending recording or playing of data, a playing direction, a playing speed, and the like) of the DV apparatus 10 without using a special command.

In addition, according to the DV apparatus 10 of the first embodiment, when the CIP header shown in FIG. 1 can be detected from an isochronous packet (including a null packet) transferred from the transmission source apparatus, the DV apparatus 10 can notify a user of an operation state (whether or not the apparatus is playing data, whether or not the apparatus is recording data, whether or not the apparatus is suspending recording or playing of data, a playing direction, a playing speed, and the like) of the transmission source apparatus without using a special command. In particular, in the case in which a null packet is received, since the DV apparatus 10 can display an operation state of the transmission source apparatus together with a blue background image (or an image which is decoded before the null packet is received), the DV apparatus 10 can notify a user of the operation state of the transmission source apparatus.

Second Embodiment

Figure 6:
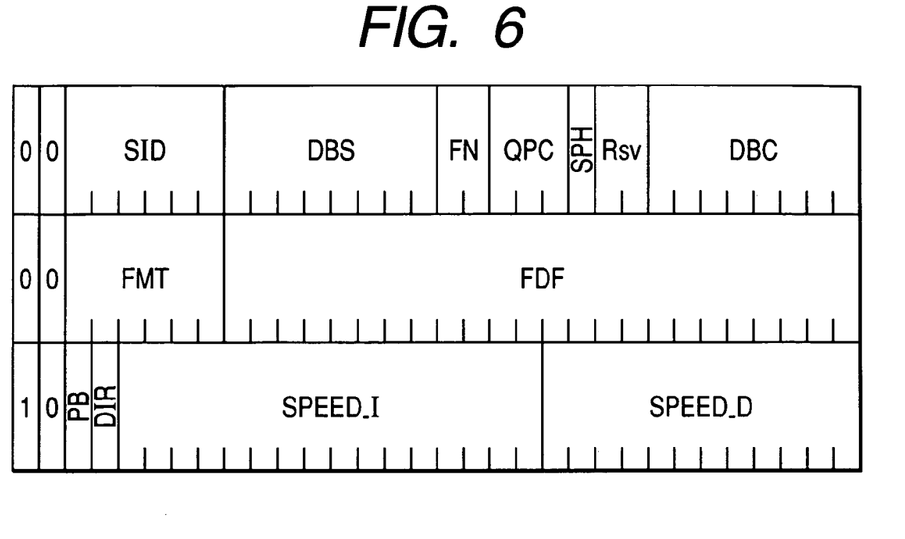
FIG. 6 is a diagram showing a constitution of a CIP header in a second embodiment.

A second embodiment of the present invention will be hereinafter described with reference to FIGS. 6 to 9. FIG. 6 is a diagram showing a constitution of a common isochronous packet (CIP) header of the second embodiment. The CIP header of the second embodiment is constituted of three quadlets (one quadlet consists of four bytes) as shown in FIG. 6.

A first quadlet has an SID field, a DBS field, an FN field, a QPC field, an SPH field, an Rsv field, and a DBC field, which are prescribed in the IEC 61883-1.

A second quadlet has an FMT field and an FDF field, which are prescribed in the IEC 61883-1.

A third quadlet has a PB field, a DIR field, a SPEED_I field, and a SPEED_D field, which are defined originally in the second embodiment. The PB field is a field storing values representing operation modes of a transmission source apparatus. The DIR field is a field storing values representing playing directions. The SPEED_I field is a field storing values representing integer parts of playing speeds. The SPEED_D field is a field storing values representing decimal parts of the playing speeds. In the case of pause, values in the entirety of the SPEED_I field and the SPEED_D field are all zero. Note that, in the second embodiment, the values stored in the SPEED_I field and the SPEED_D field are assumed to be represented by binary coded decimals (BCDs).

Figure 7:
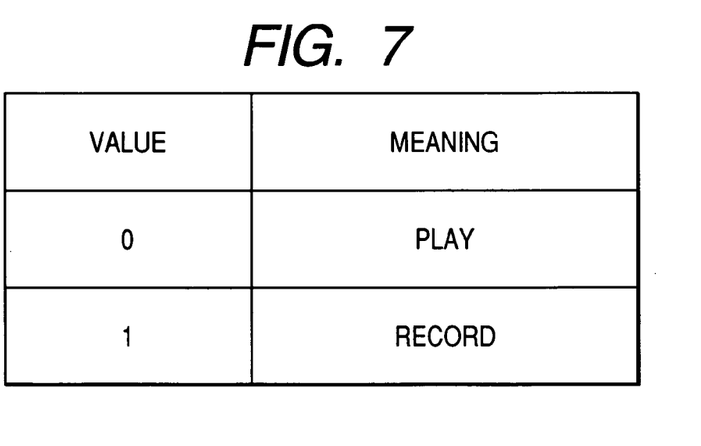
FIG. 7 is a diagram showing an example of values to be stored in a PB field.

FIG. 7 is a diagram showing an example of values to be stored in the PB field. In FIG. 7, 0 is a value indicating that an operation mode of the transmission source apparatus is a PLAY mode, and 1 is a value indicating that the operation mode of the transmission source apparatus is a RECORD mode.

Figure 8:
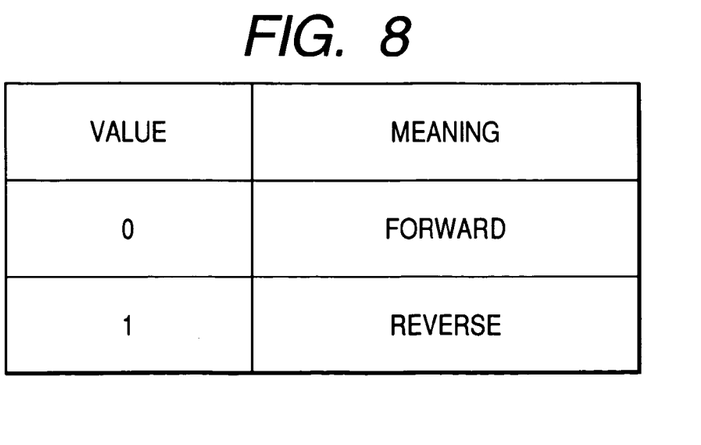
FIG. 8 is a diagram showing an example of values to be stored in a DIR field.

FIG. 8 is a diagram showing an example of values to be stored in the DIR field. In FIG. 8, 0 is a value indicating that the playing direction is the forward direction, and 1 is a value indicating that the playing direction is the reverse direction.

Figure 9:
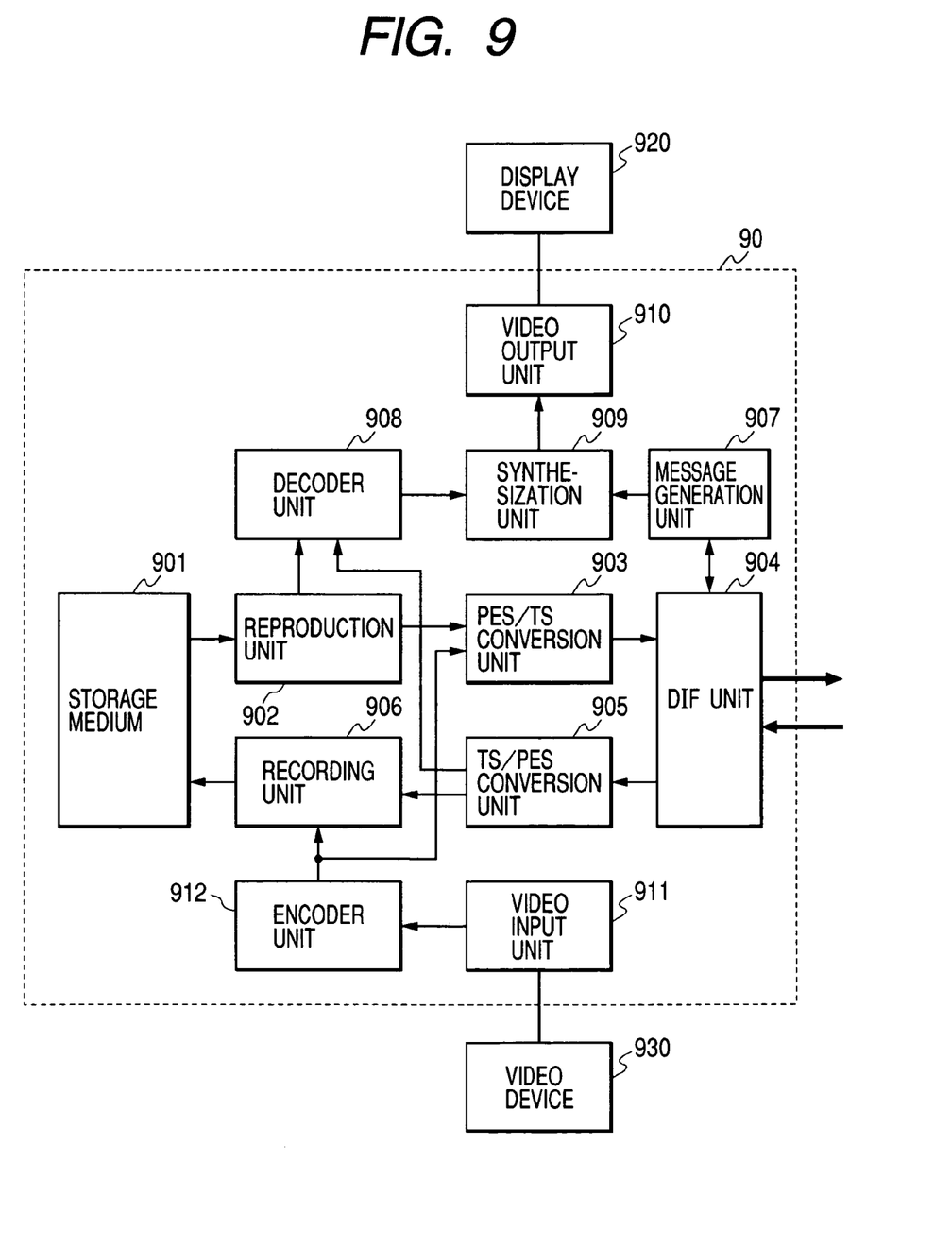
FIG. 9 is a diagram showing components of a digital video apparatus in the second embodiment.

FIG. 9 is a diagram showing components of a digital video (DV) apparatus 90 of the second embodiment. The DV apparatus 90 of the second embodiment is an apparatus that reproduces digital video data from a storage medium 901 and transfers the digital video data being played. The DV apparatus 90 is also an apparatus that records digital video data in the storage medium 901 and transfers the digital video data being recorded.

The storage medium 901 is a detachable storage medium such as a magnetic tape or a magneto-optical disk. Digital video data encoded to a packetized elementary stream (PES) packet defined by MPEG-2 is recorded on the storage medium 901.

A reproduction unit 902 reproduces the PES packet from the storage medium 901. If data is played at a special speed, the PES packet may not be reproduced normally (e.g., in the case in which the storage medium 901 is a magnetic tape). Thus, in the second embodiment, in the case in which data is played at the special speed, the reproduction unit 902 does not supply the PES packet to a PES/TS conversion unit 903, and the PES/TS conversion unit 903 does not supply a TS packet to a DIF unit 904 either.

The PES/TS conversion unit 903 converts a PES packet obtained from the reproduction unit 902 or an encoder unit 912 into a transport stream (TS) packet defined by MPEG-2.

A digital interface (DIF) unit 904 complies with the IEEE Std 1394-1995 and related standards thereof, and is capable of generating and extracting the CIP header shown in FIG. 6.

The DIF unit 904 performs processing for generating one source packet from one TS packet obtained from the PES/TS conversion unit 903, processing for generating one CIP header for every N (N is ⅛, ¼, ½, or an integer equal to or larger than 1) source packets, processing for generating one isochronous packet from the N source packets and the one CIP header, and processing for transferring one isochronous packet for each isochronous cycle (125 μsec).

In the case in which data is played at the special speed, the reproduction unit 902 does not supply a PES packet to the PES/TS conversion unit 903, and the PES/TS conversion unit 903 does not supply a TS packet to the DIF unit 904 either. Thus, the DIF unit 904 performs processing for generating an isochronous packet that includes one CIP header but does not include N source packets. In the second embodiment, the isochronous packet that includes one CIP header but does not include N source packets is called a "null packet".

For example, in the case in which data is played in the forward direction at a speed 1.0 times the normal speed (i.e., the normal speed), the DIF unit 904 generates a CIP header in which 0 (a value indicating that an operation mode is a PLAY mode) is stored in the PB field, 0 (a value indicating that the playing direction is the forward direction) is stored in the DIR field, $0001_{16}$ (a value representing 1) is stored in the SPEED_I field, and $000_{16}$ (a value representing 0) is stored in the SPEED_D field. Then, the DIF unit 904 generates an isochronous packet including one CIP header and N source packets and transfers the generated isochronous packet.

Further, for example, in the case in which data is played in the reverse direction at a speed 9.5 times the normal speed (i.e., the special speed), the DIF unit 904 generates a CIP header in which 0 (a value indicating that an operation mode is a PLAY mode) is stored in the PB field, 1 (a value indicating that the playing direction is the reverse direction) is stored in the DIR field, $0009_{16}$ (a value representing 1) is stored in the SPEED_I field, and $500_{16}$ (a value representing 0) is stored in the SPEED_D field. Then, the DIF unit 904 generates an null packet including the CIP header and transfers the generated null packet.

In addition, the DIF unit 904 performs processing for extracting N (N is ⅛, ¼, ½, or an integer equal to or larger than 1) source packets and one CIP header from one isochronous packet transferred from the transmission source apparatus, processing for supplying a third quadlet of the extracted CIP header to a message generation unit 907, and processing for extracting a TS packet from the extracted source packets.

In the case in which the transmission source apparatus is playing data at the special speed, a null packet is transferred from the transmission source apparatus. In this case, the DIF unit 904 performs processing for extracting one CIP header from the received null packet and processing for supplying a third quadlet of the extracted CIP header to the message generation unit 907.

A TS/PES conversion unit 905 converts the TS packet obtained from the DIF unit 904 into a PES packet.

A recording unit 906 records the PES packet obtained from the TS/PES conversion unit 905 onto the storage medium 901.

The message generation unit 907 analyzes the third quadlet obtained from the DIF unit 904 to detect an operation state (whether or not the apparatus is playing data, whether or not the apparatus is recording data, whether or not the apparatus is suspending recording or playing of data, a playing direction, a playing speed, and the like) of the transmission source apparatus, generating a message representing an operation state of the transmission source apparatus (hereinafter referred to as status message).

A decoder unit 908 decodes the PES packet obtained form the reproduction unit 902 or the TS/PES conversion unit 905 and generates digital video data from the decoded PES packet.

A synthesization unit 909 synthesizes the status message obtained from the message generation unit 907 with the digital video data obtained from the decoder unit 908 so that the status message is displayed in a predetermined position. In the case in which the DIF unit 904 receives a null packet, the synthesization unit 909 synthesizes the status message obtained from the message generation unit 907 with a blue background image (or an image which is decoded before the null packet is received) so that the status message is displayed in a predetermined position. Consequently, a user can learn of an operation state of the transmission source apparatus.

A video output unit 910 converts digital video data obtained from the synthesization unit 909 into a video signal and outputs the video signal. As a result, the video signal outputted from the video output unit 910 is displayed on a display device 920.

A video input unit 911 converts a video signal outputted from a video device 930 into digital video data.

The encoder unit 912 encodes the digital video data obtained from the video input unit 911 and generates a PES packet from the encoded digital video data.

In this way, according to the DV apparatus 90 of the second embodiment, the CIP header shown in FIG. 6 can be transferred to the transmission destination apparatus. Thus, the DV apparatus 90 can notify the transmission destination apparatus of an operation state (whether or not the apparatus is playing data, whether or not the apparatus is recording data, whether or not the apparatus is suspending recording or playing of data, a playing direction, a playing speed, and the like) of the DV apparatus 90 without using a special command.

In addition, according to the DV apparatus 90 of the second embodiment, when the CIP header shown in FIG. 6 can be detected from an isochronous packet (including a null packet) transferred from the transmission source apparatus, the DV apparatus 90 can notify a user of an operation state (whether or not the apparatus is playing data, whether or not the apparatus is recording data, whether or not the apparatus is suspending recording or playing of data, a playing direction, a playing speed, and the like) of the transmission source apparatus without using a special command. In particular, in the case in which a null packet is received, since the DV apparatus 90 can display an operation state of the transmission source apparatus together with a blue background image (or an image which is decoded before the null packet is received), the DV apparatus 90 can notify a user of the operation state of the transmission source apparatus.

Note that the present invention is not limited to the case in which digital video data encoded into a TS packet of MPEG-2 is transferred and is also applicable to an apparatus and a method, with which digital video data is transferred using a data header such as a CIP header. Therefore, the present invention is not limited to the first and the second embodiments.

Other Embodiments

In one case, in order to realize the functions of the above-mentioned embodiments, a program code of software for realizing the functions of the embodiments is supplied to a computer (CPU or MPU) in an apparatus or a system connected to various devices so as to operate the various devices, and the various devices are caused to operate in accordance with a program stored in the computer of the system or the apparatus. This case is also included in the scope of the present invention.

In addition, in this case, the program code itself of the software realizes the functions of the embodiments and constitutes the present invention. As a transfer medium for the program code, a communication medium (wire lines such as an optical fiber, wireless lines, etc.) in a computer network (LAN, WAN such as the Internet, a wireless communication network, etc.) system for propagating program information as a carrier wave to supply the program information can be used.

Moreover, means for supplying the program code to a computer, for example, a recording medium storing such a program code constitutes the present invention. As the recording medium storing such a program code, for example, a flexible disk, a hard disk, an optical disk, a magneto-optical disk, a CD-ROM, a magnetic tape, a nonvolatile memory card, a ROM, or the like can be used.

In addition, the functions of the above-mentioned embodiments are not only realized by the computer executing the supplied program code but also realized by the program code in cooperation with an operating system (OS), other application software, or the like running on the computer. In this case, it is needless to mention that such a program code is included in the embodiments of the present invention.

Moreover, after the supplied program code is stored in a memory provided in a function extending board of the computer or a function extending unit connected to the computer, a CPU or the like provided in the function extending board or the function extending unit performs a part or all of actual processing on the basis of an instruction of the program code, and the functions of the embodiments are realized by the processing. It is needless to mention that such a program is also included in the present invention.

Note that all the shapes and structures of the respective units described in the embodiments are only shown as examples of embodiments in carrying out the present invention. A technical scope of the present invention should not be interpreted restrictively by these shapes and structures. In other words, the present invention can be carried out in various forms without departing form the scope or main characteristics of the present invention. For example, although the embodiments are described with the DV apparatus having the PLAY mode and the RECORD mode as an example, an apparatus performing only playing or only recording may be adopted.

The above-described preferred embodiments are merely exemplary of the present invention, and are not be construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

What is claimed is:

1. A reproduction apparatus comprising:
    a reproduction unit that reproduces digital video data from a storage medium; and
    a communication unit that (a) generates a packet including additional data and the digital video data if the digital video data is reproduced from the storage medium at a normal speed, (b) generates a packet including the additional data but not including any of the digital video data if the digital video data is reproduced from the storage medium at a special speed, and (c) transfers the generated packet,
    wherein the additional data includes both first data indicating a playing direction and second data indicating a playing speed.

2. The reproduction apparatus according to claim 1, wherein the additional data also includes third data indicating whether the digital video data is being played.

3. The reproduction apparatus according to claim 1, further comprising:
    a conversion unit that converts the digital video data reproduced from the storage medium into a TS (transport stream) packet conformed to MPEG-2.

4. The reproduction apparatus according to claim 1, wherein the additional data comprises a part of a CIP (common isochronous packet) header conformed to IEC 61883-1.

5. A method of controlling a reproduction apparatus, the method comprising the steps of:
    reproducing digital video data from a storage medium;
    generating a packet including additional data and the digital video data if the digital video data is reproduced from the storage medium at a normal speed;
    generating a packet including the additional data but not including any of the digital video data if the digital video data is reproduced from the storage medium at a special speed; and
    transferring the generated packet,
    wherein the additional data includes both first data indicating a playing direction and second data indicating a playing speed.

6. The method according to claim 5, wherein the additional data also includes third data indicating whether the digital video data is being played.

7. The method according to claim 5, further comprising the step of:
    converting the digital video data reproduced from the storage medium into a TS (transport stream) packet conformed to MPEG-2.

8. The method according to claim 5, wherein the additional data comprises a part of a CIP (common isochronous packet) header conformed to IEC 61883-1.

* * * * *